J. A. Jackson.
Bee-Hive.
№ 74369  Patented Feb. 11, 1868.
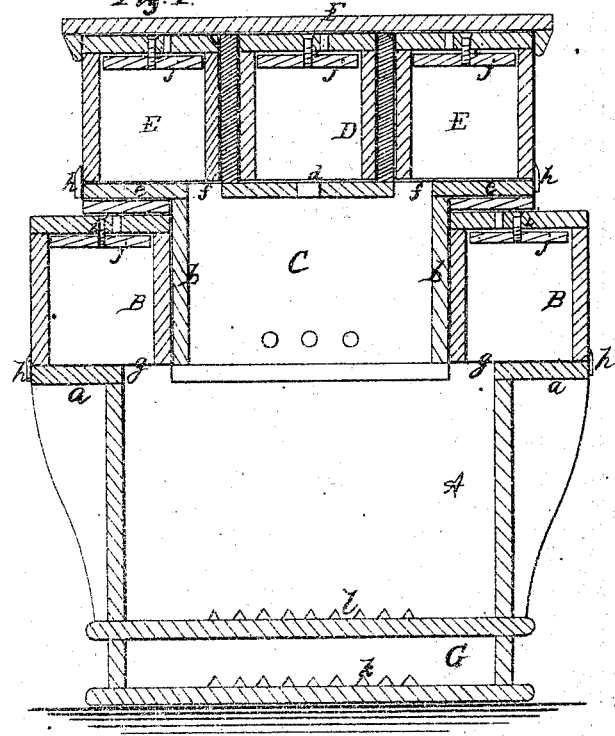
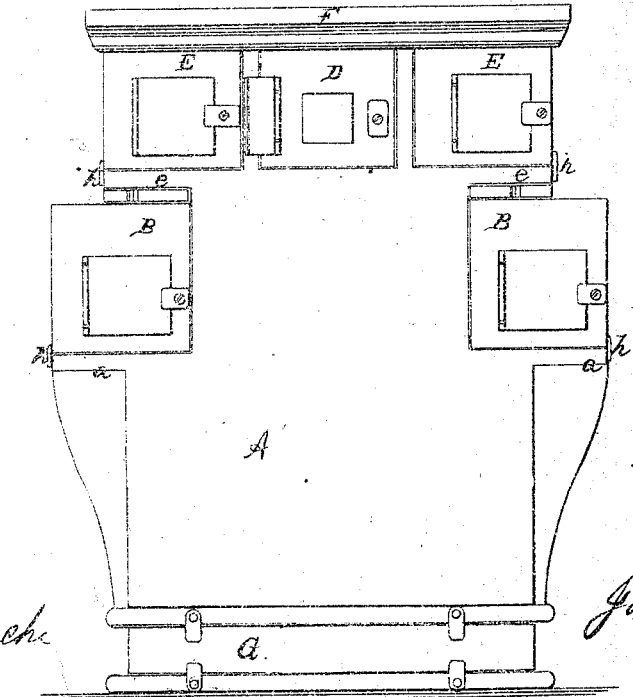
Witnesses.  
Theo Tusche  
W. Truvin
Inventor.  
Jas. A. Jackson  
Per Munn & Co.  
Attorneys

United States Patent Office.

JAMES A. JACKSON, OF MACON, MICHIGAN.

*Letters Patent No. 74,369, dated February 11, 1868.*

---

IMPROVEMENT IN BEE-HIVES.

---

*The Schedule referred to in these Letters Patent and making part of the same.*

---

TO ALL WHOM IT MAY CONCERN:

Be it known that I, JAMES A. JACKSON, of Macon, in the county of Lenawee, and State of Michigan, have invented a new and improved Bee-Hive; and I do hereby declare that the following is a full, clear, and exact description thereof, which will enable others skilled in the art to make and use the same, reference being had to the accompanying drawings and to the letters of reference marked thereon.

This invention consists in a novel manner of constructing a bee-hive, as hereinafter fully shown and described, whereby a large number of spare-honey boxes may be used or applied, the bees allowed to work with facility, and moths entrapped, so that the bees will not be materially annoyed by them. In the accompanying sheet of drawings—

Figure 1 is a vertical central section of my invention.

Figure 2, a side view of the same.

Similar letters of reference indicate like parts.

The main portion, A, of the hive is of square form, and of any suitable dimensions, and has horizontal projections $a$ $a$ at two opposite sides of it, to serve as rests or supports for two spare-honey boxes, B B, vertical partitions $b$ $b$ being on the top of A, with which partitions the inner sides of the boxes B are in contact. The partitions $b$ $b$ form an upper compartment, C, which communicates with A. On the top of the compartment C there are two vertical partitions, $c$ $c$, which form a compartment to receive a spare-honey box, D, the bottom of this compartment being perforated, as shown at $d$, to form a communication between the box D and the compartment C, and at two opposite sides of the top of C there are horizontal projections $e$ $e$, to serve as supports for two spare-honey boxes, E E, which communicate with C by means of openings $ff$. Similar openings, $g$ $g$, are at the top of the main part, A, of the hive, to form a communication between it and the boxes B B.

By this arrangement it will be seen that five spare-honey boxes are applied to the hive, to all of which there is free access, and the bees allowed to construct their comb in all of them from the top downward—the natural way; and, in the event of a portion of the bees congregating or gathering in a mass within the hive, which generally occurs previous to swarming, the bees, thus collected, will not serve to obstruct the working portion of the bees.

The three uppermost honey-boxes are side by side, in line with each other, and the outer ones are retained in position by buttons $h$. The top boxes are covered by a cap, F, and within each box there is secured, by a screw, $i$, a supplemental top, $j$. These supplemental tops are for the purpose of allowing the honey to be readily removed from the boxes, the bees attaching their combs to them, and, by passing a knife into the boxes and moving it along the sides, the combs, by detaching the supplemental tops, may be taken from the boxes with the greatest facility.

The main portion, A, of the hive rests upon a shallow box, G, which has holes $k$ at one side of it, directly below the holes or bee-entrances $l$, in A. The moth enters the holes $k$, and is entrapped in the box G, the latter being cleaned out from time to time, and the moth destroyed.

Having thus described my invention, I claim as new, and desire to secure by Letters Patent—

The supplemental tops $j$, fitted in the spare-honey boxes, substantially in the manner as and for the purpose set forth.

JAMES A. JACKSON.

Witnesses:
ISRAEL PENNINGTON
G. W. BURDETT.